US011207840B2

(12) United States Patent
Leung et al.

(10) Patent No.: US 11,207,840 B2
(45) Date of Patent: Dec. 28, 2021

(54) PRE-FABRICATED SUPPORTS, A SYSTEM FOR ADDITIVE MANUFACTURING A THREE-DIMENSIONAL OBJECT, AND A RELATED METHOD

(71) Applicant: THE BOEING COMPANY, Chicago, IL (US)

(72) Inventors: Andrew Leung, Philadelphia, PA (US); Howard Thomas Rolleston, Glen Mills, PA (US)

(73) Assignee: The Boeing Company, Chicago, IL (US)

( * ) Notice: Subject to any disclaimer, the term of this patent is extended or adjusted under 35 U.S.C. 154(b) by 376 days.

(21) Appl. No.: 16/199,864

(22) Filed: Nov. 26, 2018

(65) Prior Publication Data

US 2020/0164590 A1    May 28, 2020

(51) Int. Cl.
| | |
|---|---|
| *B29C 64/40* | (2017.01) |
| *B29C 64/393* | (2017.01) |
| *B29C 64/357* | (2017.01) |
| *B33Y 50/02* | (2015.01) |
| *B33Y 30/00* | (2015.01) |

(Continued)

(52) U.S. Cl.
CPC .......... *B29C 64/40* (2017.08); *B29C 64/357* (2017.08); *B29C 64/393* (2017.08); *B33Y 10/00* (2014.12); *B33Y 30/00* (2014.12); *B33Y 40/00* (2014.12); *B33Y 50/02* (2014.12)

(58) Field of Classification Search
CPC ..... B29C 64/40; B29C 64/357; B29C 64/393; B29C 64/245; B33Y 10/00; B33Y 30/00; B33Y 40/00; B33Y 50/02; B33Y 80/00; B33Y 70/00; B22F 3/1055; B22F 2003/1058
See application file for complete search history.

(56) References Cited

U.S. PATENT DOCUMENTS

| | | | |
|---|---|---|---|
| 9,856,644 B2* | 1/2018 | Gosling | ................ E04B 2/7427 |
| 10,988,909 B1* | 4/2021 | Cotrell | .................... F03D 13/22 |

(Continued)

FOREIGN PATENT DOCUMENTS

WO    WO 2017/025956    2/2017

*Primary Examiner* — Thomas C Lee
*Assistant Examiner* — Ameir Myers
(74) *Attorney, Agent, or Firm* — Womble Bond Dickinson (US) LLP

(57) ABSTRACT

A system for additive manufacturing a three-dimensional object includes pre-fabricated supports arrangeable to support the three-dimensional object during additive manufacturing; and a computer configured to at least: access a computer geometric model of the three-dimensional object, and geometric parameters of the pre-fabricated supports; and generate an arrangement of the pre-fabricated supports with respective coordinates in a coordinate system, to support the three-dimensional object in the coordinate system during additive manufacturing, the computer being configured to generate the arrangement based on the computer geometric model of the three-dimensional object and the geometric parameters of the pre-fabricated supports, the computer being configured to generate different arrangements of the pre-fabricated supports for different three-dimensional objects having different computer geometric models.

22 Claims, 9 Drawing Sheets

(51) Int. Cl.
   *B33Y 40/00*   (2020.01)
   *B33Y 10/00*   (2015.01)

(56) References Cited

U.S. PATENT DOCUMENTS

| | | | |
|---|---|---|---|
| 2018/0056595 A1* | 3/2018 | Sterenthal | B33Y 50/02 |
| 2018/0304364 A1* | 10/2018 | Myerberg | B33Y 40/00 |
| 2019/0040637 A1* | 2/2019 | Ahto | E04G 5/10 |
| 2019/0160735 A1* | 5/2019 | Prakash | B29C 64/268 |
| 2019/0232567 A1* | 8/2019 | Yamazaki | G09B 23/20 |
| 2020/0329814 A1* | 10/2020 | Wang | B29C 64/245 |

* cited by examiner

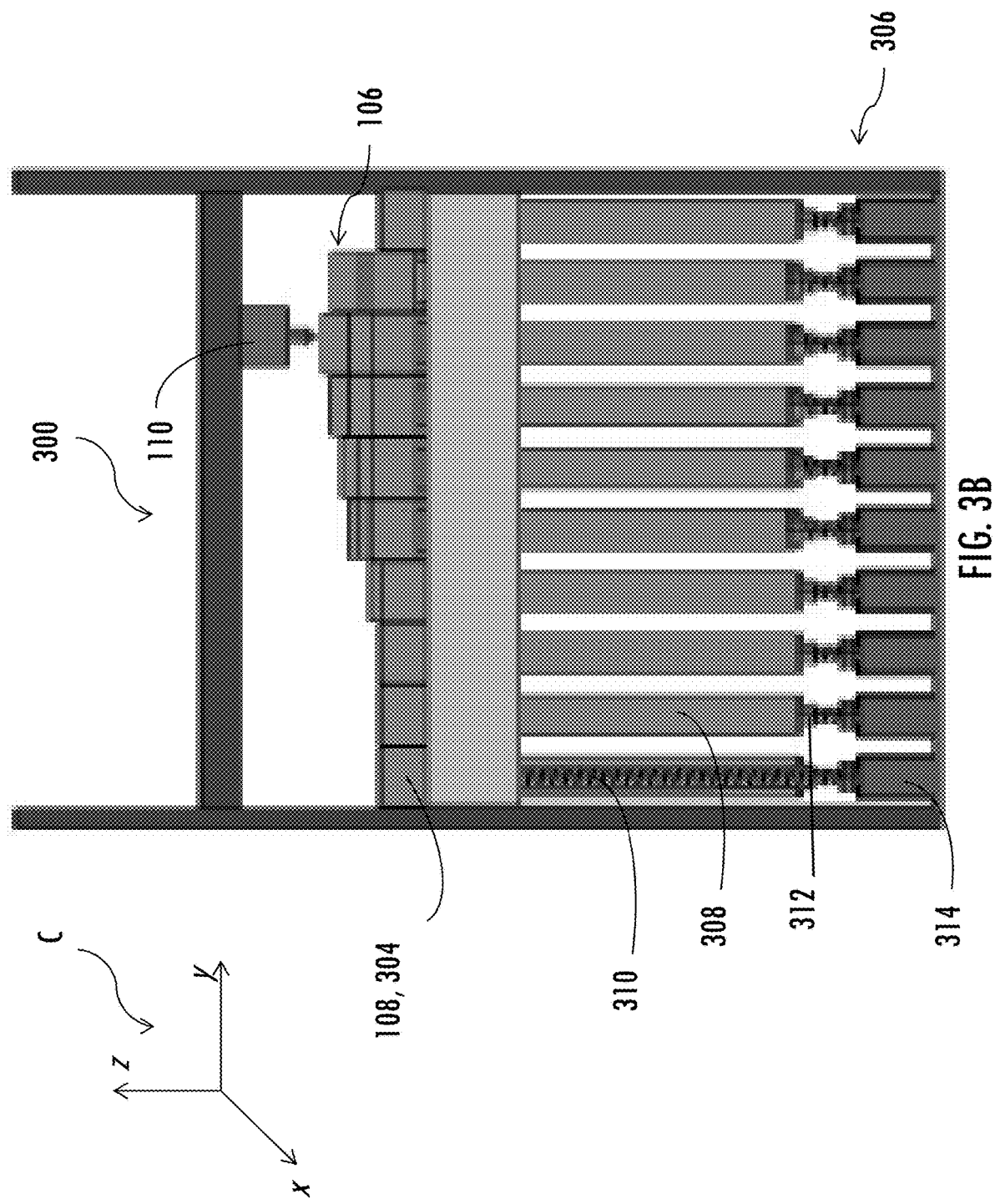

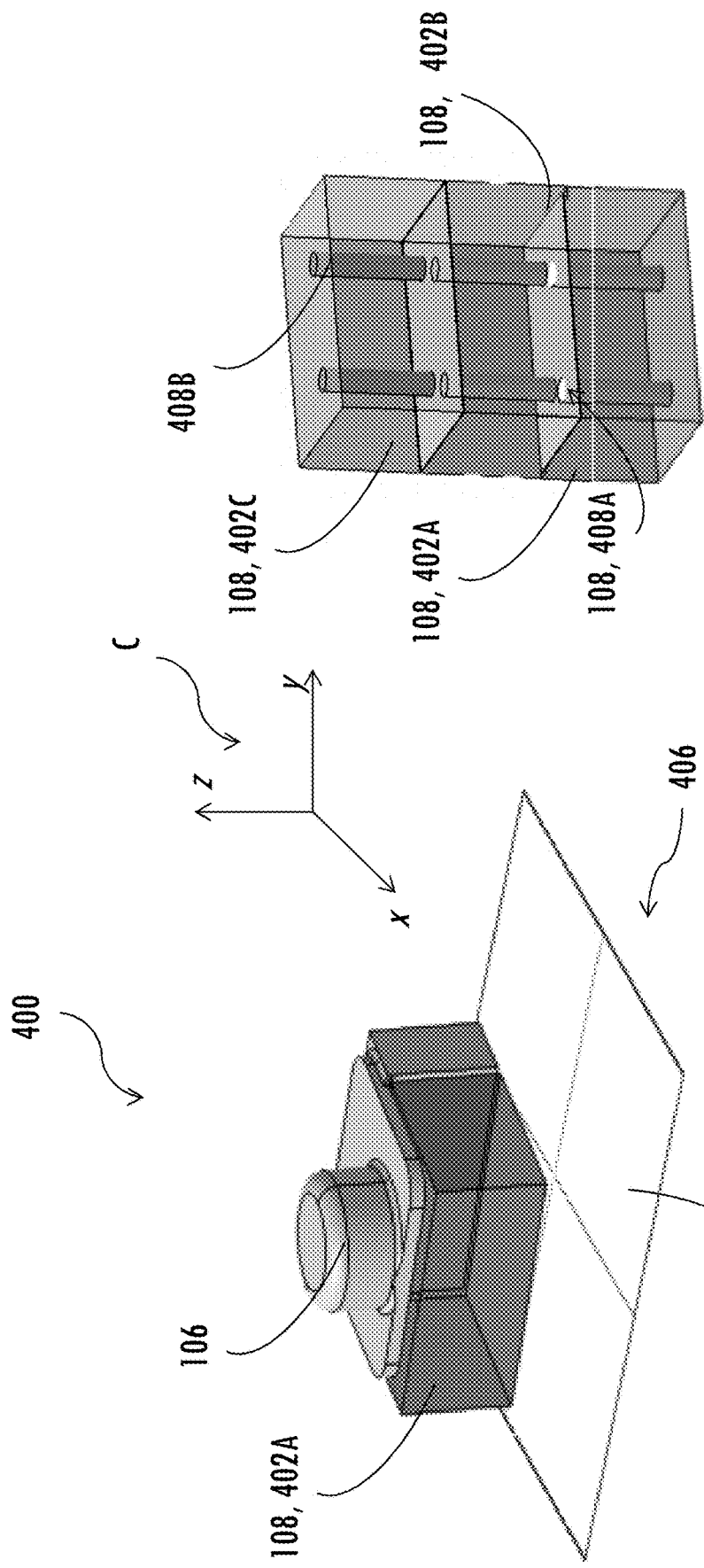

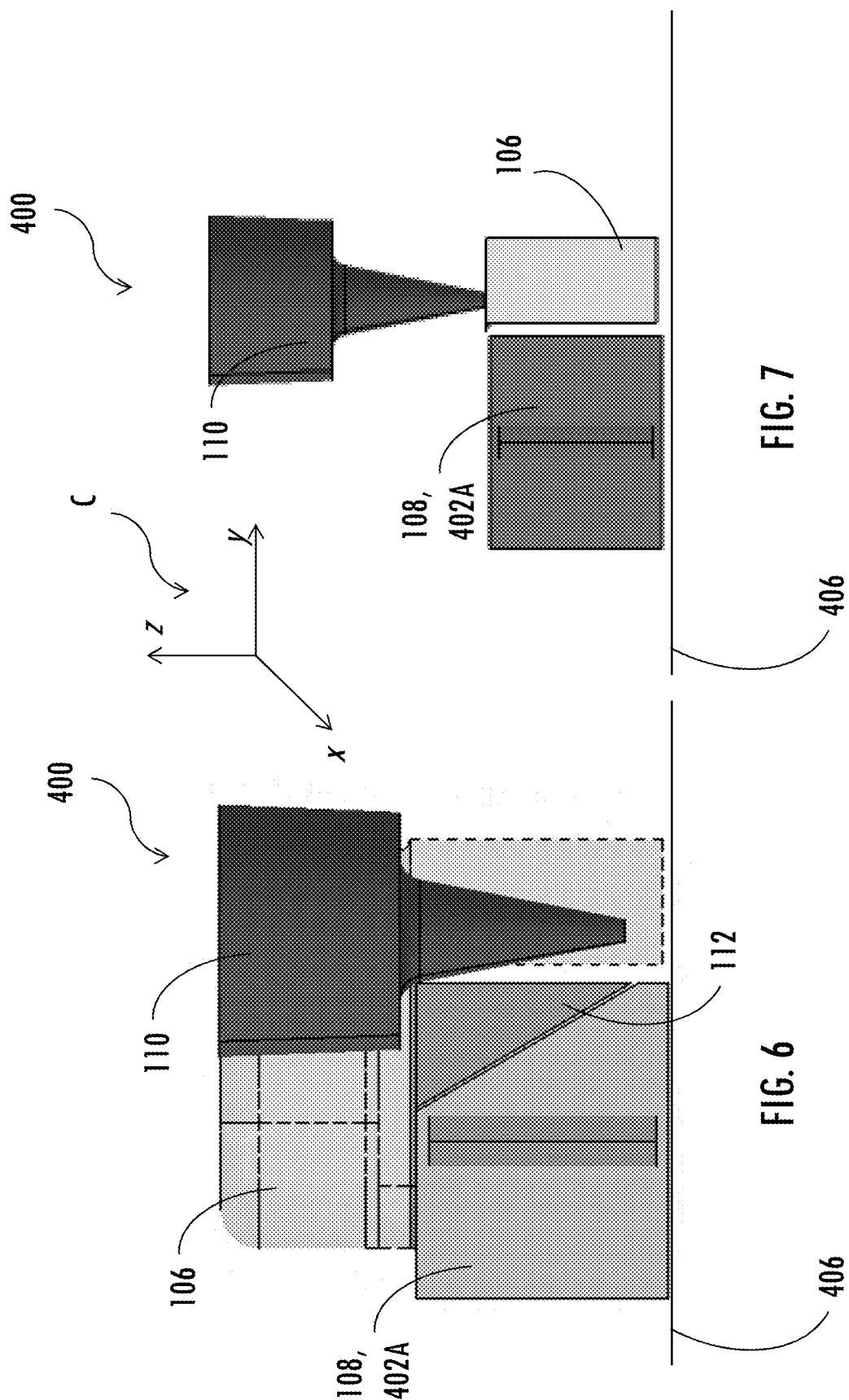

US 11,207,840 B2

PRE-FABRICATED SUPPORTS, A SYSTEM FOR ADDITIVE MANUFACTURING A THREE-DIMENSIONAL OBJECT, AND A RELATED METHOD

TECHNOLOGICAL FIELD

The present disclosure relates generally to additive manufacturing and, in particular, to pre-fabricated supports for additive manufacturing a three-dimensional object.

BACKGROUND

In recent years, many different additive manufacturing techniques for the fast production of three-dimensional (3D) objects have been developed. Additive manufacturing and related variations thereof are sometimes referred to as 3D printing, solid freeform fabrication, rapid prototyping and manufacturing and the like. Additive manufacturing includes many different techniques for forming three-dimensional objects on a layer-by-layer basis from a build material utilizing layer or sliced data representing cross-sections of the objects. These techniques include, for example, extrusion-deposition or selective deposition modeling (SDM) techniques such as fused deposition modeling (FDM) and fused filament fabrication (FFF), stereolithography (SLA), polyjet printing (PJP), multi-jet printing (MJP), selective laser sintering (SLS), three-dimensional printing (3DP) techniques such as color-jet printing (CJP), and the like.

A number of additive manufacturing techniques form a three-dimensional object from a corresponding computer geometric model, which is often provided by a computer-aided design system (this computer geometric model at times referred to as a CAD model). The computer geometric model may represent the object and its structural components by a collection of geometry. The computer geometric model may then be sliced into layer data that defines layers of the object. This layer data may be formatted into an appropriate language that describes a tool path for forming the object, which may be received by an additive manufacturing system to manipulate build material to form the object on a layer-by-layer basis.

Where the object includes a more complex shape, the computer geometric model may also include a design of sacrificial or support structures for supporting the object during additive manufacture. As such, during layer-by-layer deposition of build material to form the object, the build material, complimentary support material, or a combination of both may also be deposited layer-by-layer to form the support structures. The object so formed may, thus, comprise support structures, which must be removed either physically or chemically. Formation and removal of the support structures thereby requires additional material to form the support structures, which are then removed from the object and discarded as waste.

Accordingly, it would be desirable to have a system and method that takes into account at least some of the issues discussed above, as well as other possible issues.

BRIEF SUMMARY

Example implementations of the present disclosure are generally directed to pre-fabricated supports for additive manufacturing a three-dimensional object including pre-fabricated supports. The pre-fabricated supports of example implementations reduce costs by preventing or minimizing waste and reducing build time associated with sacrificial or support structures deposited during the additive manufacturing process.

The present disclosure thus includes, without limitation, the following example implementations. Some example implementations provide a system for additive manufacturing a three-dimensional object, the system comprising pre-fabricated supports arrangeable to support the three-dimensional object during additive manufacturing; and a computer configured to at least: access a computer geometric model of the three-dimensional object, and geometric parameters of the pre-fabricated supports; and generate an arrangement of the pre-fabricated supports with respective coordinates in a coordinate system, to support the three-dimensional object in the coordinate system during additive manufacturing, the computer being configured to generate the arrangement based on the computer geometric model of the three-dimensional object and the geometric parameters of the pre-fabricated supports, the computer being configured to generate different arrangements of the pre-fabricated supports for different three-dimensional objects having different computer geometric models In some example implementations of the system of any preceding or any subsequent example implementation, or any combination thereof, the computer is further configured to at least: form layer data defining layers of the computer geometric model independent of the pre-fabricated supports; and format the layer data for an additive manufacturing system configured to manipulate build material to form the three-dimensional object on a layer-by-layer basis, with the pre-fabricated supports in the arrangement being configured to support the three-dimensional object as the three-dimensional object is formed.

In some example implementations of the system of any preceding or any subsequent example implementation, or any combination thereof, the coordinate system defines orthogonal axes including x- and y-axes, and a z-axis, and the pre-fabricated supports are independently height adjustable in the direction of the z-axis to respective heights as defined by the arrangement.

In some example implementations of the system of any preceding or any subsequent example implementation, or any combination thereof, the computer is configured to generate the arrangement includes being configured to: analyze the computer geometric model to identify regions of the three-dimensional object requiring support; determine heights of the regions in the computer geometric model of the three-dimensional object; and determine the respective heights of the pre-fabricated supports based on the heights of regions in the computer geometric model, the heights of the regions and the respective heights of the pre-fabricated supports being defined by a distance from a bottommost region of the computer geometric model in the direction of the z-axis.

In some example implementations of the system of any preceding or any subsequent example implementation, or any combination thereof, the computer is configured to determine an automatic or a manual method of arranging the pre-fabricated supports.

In some example implementations of the system of any preceding or any subsequent example implementation, or any combination thereof, the geometric parameters of the pre-fabricated supports comprise at least one of a surface area of an uppermost region of each of the pre-fabricated supports, a height of each of the pre-fabricated supports defined by a distance from a bottommost region to the uppermost region of each of the pre-fabricated supports in the direction of the z-axis, or a shape of each of the pre-fabricated supports.

In some example implementations of the system of any preceding or any subsequent example implementation, or any combination thereof, the system further comprises the additive manufacturing system including an extruder configured to dispense build material on the pre-fabricated supports to form the three-dimensional object based on the computer geometric model of the three-dimensional object.

In some example implementations of the system of any preceding or any subsequent example implementation, or any combination thereof, the pre-fabricated supports are pre-arranged in a patterned grid in the directions of the x- and y-axes, the pre-fabricated supports define modules in the patterned grid, and the modules are independently height adjustable in the direction of the z-axis to the respective heights as defined by the arrangement.

In some example implementations of the system of any preceding or any subsequent example implementation, or any combination thereof, the system further comprises actuators coupled to and configured to move respective ones of the modules in the direction of the z-axis such that the modules are independently height adjustable in the direction of the z-axis.

In some example implementations of the system of any preceding or any subsequent example implementation, or any combination thereof, the pre-fabricated supports comprise modular structures arrangeable on modules of a patterned grid in the directions of the x- and y-axes, and independently stackable in the direction of the z-axis to the respective heights, as defined by the arrangement.

In some example implementations of the system of any preceding or any subsequent example implementation, or any combination thereof, the modular structures including a first type modular structure with a bottom surface that is alignable with a selected one of the modular structures as defined by the arrangement.

In some example implementations of the system of any preceding or any subsequent example implementation, or any combination thereof, the first type modular structure has a top surface with first alignment elements opposing the bottom surface, and the modular structures further include a second type modular structure with a bottom surface having second alignment elements alignable with the first alignment elements on the top surface of the first type modular structure, and wherein the second type modular structure has a top surface with the first alignment elements opposing the bottom surface with the second alignment elements, and the modular structures further include a third type modular structure with a bottom surface having the second alignment elements alignable with the first alignment elements of the top surface of the second type modular structure, or the top surface of the first type modular structure, the third type modular structure also with an opposing top surface to support the three-dimensional object during additive manufacturing.

In some example implementations of the system of any preceding or any subsequent example implementation, or any combination thereof, the computer is further configured to generate the arrangement of the modular structures on the individual modules of the patterned grid, and which of the modular structures including the first type modular structure, the second type modular structure, and the third type modular structure to arrange on the patterned grid in the directions of the x- and y-axes, and stack in the direction of the z-axis to the respective heights as defined by the arrangement.

Some example implementations provide pre-fabricated supports arrangeable to support a three-dimensional object during additive manufacturing, wherein the pre-fabricated supports are arrangeable in a computer-generated arrangement with respective coordinates in a coordinate system, to support the three-dimensional object in the coordinate system during additive manufacturing, the pre-fabricated supports being arrangeable in different arrangements for different three-dimensional objects.

In some example implementations of the supports of any preceding or any subsequent example implementation, or any combination thereof, the coordinate system defines orthogonal axes including x- and y-axes, and a z-axis, and the pre-fabricated supports are independently height adjustable in the direction of the z-axis to respective heights.

In some example implementations of the supports of any preceding or any subsequent example implementation, or any combination thereof, the pre-fabricated supports are pre-arranged in a patterned grid in the directions of the x- and y-axes, the pre-fabricated supports define modules in the patterned grid, and the modules are independently height adjustable in the direction of the z-axis to the respective heights.

In some example implementations of the supports of any preceding or any subsequent example implementation, or any combination thereof, the pre-fabricated supports comprise modular structures arrangeable on modules of a patterned grid in the directions of the x- and y-axes, and independently stackable in the direction of the z-axis to the respective heights.

In some example implementations of the supports of any preceding or any subsequent example implementation, or any combination thereof, the modular structures including a first type modular structure with a bottom surface that is alignable with a selected one of the modular structures.

In some example implementations of the supports of any preceding or any subsequent example implementation, or any combination thereof, the first type modular structure has a top surface with first alignment elements opposing the bottom surface, and the modular structures further include a second type modular structure with a bottom surface having second alignment elements alignable with the first alignment elements on the top surface of the first type modular structure, and wherein the second type modular structure has a top surface with the first alignment elements opposing the bottom surface with the second alignment elements, and the modular structures further include a third type modular structure with a bottom surface having the second alignment elements alignable with the first alignment elements of the top surface of the second type modular structure, or the top surface of the first type modular structure, the third type modular structure also with an opposing top surface to support the three-dimensional object during additive manufacturing.

In some example implementations of the supports of any preceding or any subsequent example implementation, or any combination thereof, the generated arrangement includes a determination of an automatic or a manual method of arranging the pre-fabricated supports.

Some example implementations provide a method for supporting a three-dimensional object during additive manufacturing, the method comprising: generating a computer-generated arrangement with respective coordinates in a coordinate system for arranging one or more pre-fabricated supports therein, and arranging the one or more pre-fabricated supports in the computer-generated arrangement for supporting the three-dimensional object, the pre-fabricated supports being arrangeable in different arrangements for different three-dimensional objects.

In some example implementations of the method of any preceding or any subsequent example implementation, or any combination thereof, the coordinate system defines orthogonal axes including x- and y-axes, and a z-axis, and arranging the one or more pre-fabricated supports in the computer-generated arrangement includes independently adjusting a height of the one or more pre-fabricated supports in the direction of the z-axis to respective heights.

In some example implementations of the method of any preceding or any subsequent example implementation, or any combination thereof, the pre-fabricated supports define modules in a patterned grid, and wherein arranging the one or more pre-fabricated supports in the computer generated arrangement includes pre-arranging the modules in the patterned grid in the directions of the x- and y-axes, and independently adjusting the height of the modules in the direction of the z-axis to the respective heights.

In some example implementations of the method of any preceding or any subsequent example implementation, or any combination thereof, the pre-fabricated supports include modular structures, and wherein arranging the one or more pre-fabricated supports in the computer-generated arrangement includes arranging the modular structures on modules of a patterned grid in the directions of the x- and y-axes, and independently stacking the modular structures in the direction of the z-axis to the respective heights.

In some example implementations of the method of any preceding or any subsequent example implementation, or any combination thereof, generating the computer-generated arrangement includes determining an automatic or a manual method of arranging the one or more pre-fabricated supports in the computer-generated arrangement.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as intended, namely to be combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

FIGS. 3A and 3B illustrate different views of a system for additive manufacturing a three-dimensional object with pre-arranged pre-fabricated supports, in a patterned grid in accordance with example implementations of the present disclosure;

FIG. 4 illustrates an example arrangement of pre-fabricated supports comprising a modular structure arranged on a module of a patterned grid and supporting an object deposited by an additive manufacturing system, in accordance with other example implementations of the present disclosure;

FIG. 5 illustrates three modular structures usable in the system in FIG. 4;

FIGS. 6 and 7 illustrate systems for additive manufacturing a three-dimensional object and a pre-fabricated support structure comprising a modular structure, in accordance with other example implementations of the present disclosure;

DETAILED DESCRIPTION

Figure 1:
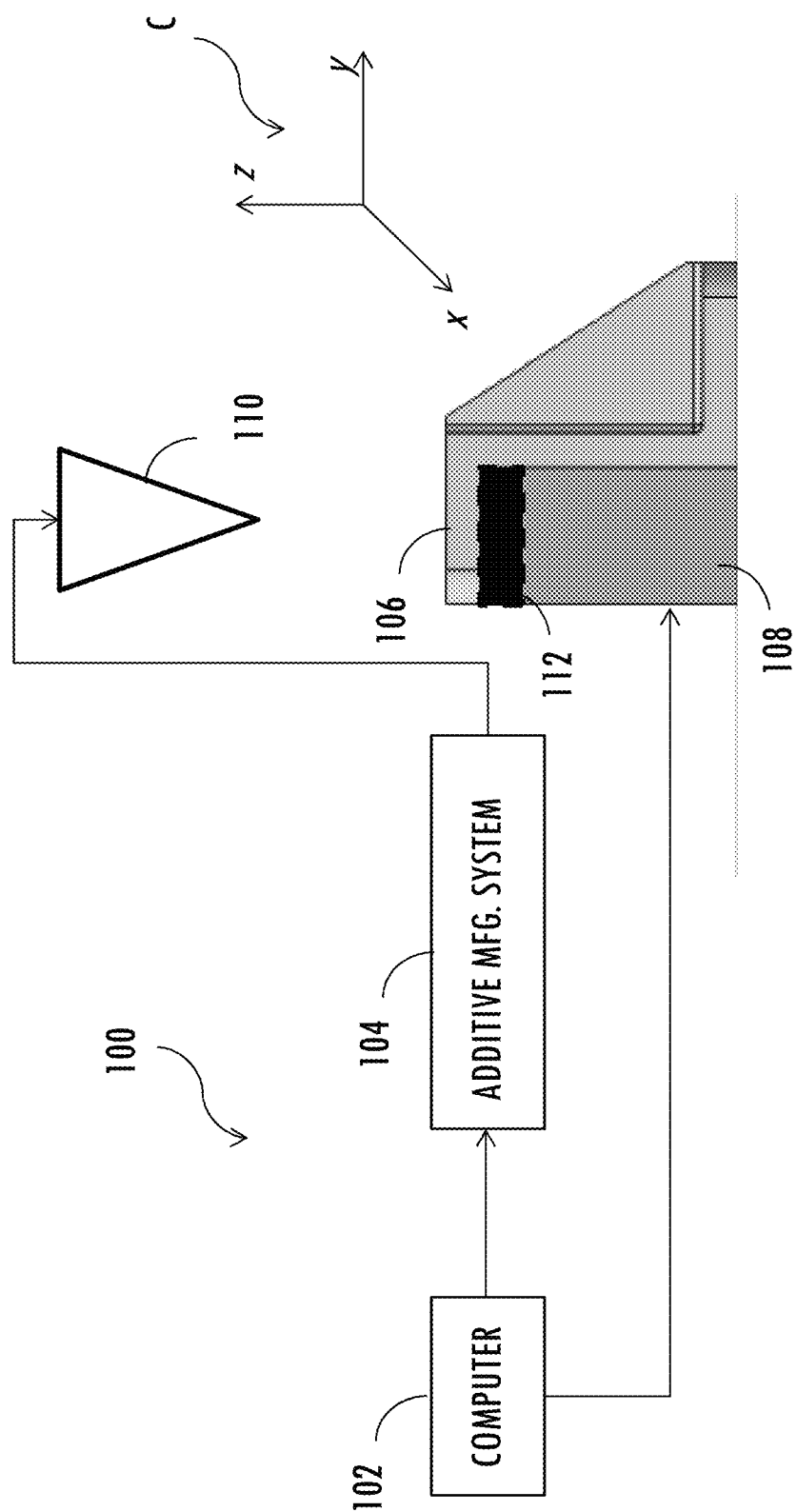
FIG. 1 illustrates a system including a computer and an additive manufacturing system, in accordance with example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, for example, reference may be made herein to quantitative measures, values, relationships or the like (e.g., planar, coplanar, perpendicular). Unless otherwise stated, any one or more if not all of these may be absolute or approximate to account for acceptable variations that may occur, such as those due to engineering tolerances or the like. Like reference numerals refer to like elements throughout.

Example implementations of the present disclosure relate generally to additive manufacturing. Referring now to FIG. 1, a system 100 is illustrated according to example implementations of the present disclosure. The system may include any of a number of different apparatuses, subsystems and the like for performing one or more functions or operations. As shown, for example, the system may include a computer 102 and an additive manufacturing system 104. The computer may be generally configured to receive and prepare data for receipt by the additive manufacturing system, and from which the additive manufacturing system may be configured to manipulate build material to form a physical, tangible three-dimensional object ("object") 106. The computer may also be configured to generate an arrangement of pre-fabricated supports 108 with respective coordinates in a coordinate system C.

The additive manufacturing system 104 may be configured to form the object 106 in accordance with any of a number of additive manufacturing techniques. Examples of suitable additive manufacturing techniques include extrusion-deposition or selective deposition modeling (SDM) techniques such as fused deposition modeling (FDM) and fused filament fabrication (FFF), stereolithography (SLA), polyjet printing (PJP), multi-jet printing (MJP), selective laser sintering (SLS), three-dimensional printing (3DP) techniques such as color-jet printing (CJP), and the like.

The additive manufacturing system 104 may include an extruder 110 configured to dispense additional build material 112 on or adjacent to the pre-fabricated supports 108 to support the three-dimensional object or build material on or adjacent to the pre-fabricated supports to form the three-dimensional object 106 based on a computer geometric model of the three-dimensional object and geometric parameters of the pre-fabricated supports. The build material may be deposited or dispensed in a layer-by-layer basis using the extruder according to formatted layer data defining layers of the computer geometric model. Depending on the build material, each of the deposited layers may then be cured or solidified using a suitable device. Examples of suitable build materials include thermoplastics, high-density polyethylene (HDPE), eutectic metals, edible materials, rubber, modelling clay, plasticine, RTV silicone, porcelain, metal clay, starch, gypsum plaster, sand, acrylic powder, and the like.

The pre-fabricated supports 108 generally illustrated in FIG. 1 may be defined as a structure manufactured prior to deposition of the build material in a layer-by-layer basis for forming the three-dimensional object 106 by the additive manufacturing system 104. In this manner, the pre-fabricated supports are considered "pre-fabricated" relative to the fabrication of the three-dimensional object 106. The pre-fabricated supports may be manufactured from a three-dimensional (3D) printed modeling material, metal, injection molding, and 3D printing support material coated with a harder coating, e.g., a lacquer, so it can be used multiple times. According to some example implementations, the pre-fabricated supports may be coated with a material to facilitate separating the object from the pre-fabricated supports. Optionally, a polyethylene (PE) film may be used to coat a surface of the pre-fabricated supports on which the build material is to be deposited.

The pre-fabricated supports 108 may be pre-fabricated by known manufacturing methods including but not limited to additive manufacturing, milling with computer numerical control (CNC) or by molding, e.g. injection molding. In some examples, a surface of the three-dimensional object that is exposed after removal of the pre-fabricated supports is of improved quality over the surface exposed after removing printed support material, as in typical additive manufacturing. According to some example implementations, the pre-fabricated supports facilitate mass customization and mass production with known additive manufacturing processes, as compared to using only printed support material.

In some examples, the pre-fabricated supports are reusable and do not need to be discarded after each additive manufacturing session.

Accordingly, in some example implementations, the computer 102 is configured to at least access a computer geometric model of the three-dimensional object 106 to be manufactured, and geometric parameters of the pre-fabricated supports 108. The computer geometric model of the three-dimensional object may comprise a mathematical description of the three-dimensional object. The computer geometric model may be defined using b-rep (boundary representation) geometry definition or by any polygonal representation. The geometric parameters of the pre-fabricated supports may comprise at least one of a surface area of an uppermost region of each of the pre-fabricated supports, a height of each of the pre-fabricated supports defined by a distance from a bottommost region to the uppermost region of each of the pre-fabricated supports in a direction of a z-axis, or a shape of each of the pre-fabricated supports.

More particularly, the computer 102 being configured to access the computer geometric model to form the arrangement may comprise analyzing, by the computer, the computer geometric model to identify regions of the three-dimensional object 106 requiring support and determine heights of these regions in the computer geometric model of the three-dimensional object. For example, the computer 102 may perform a geometric analysis of the computer geometric model to identify a region of the three-dimensional object requiring support material (e.g., pre-fabricated support(s) 108, as well as additional build material 112 (conventional support material), if necessary).

In addition, the computer 102 may be configured to determine what volume (e.g., height in a direction of the z-axis) of conventional support material may be able to be replaced/supplemented with pre-fabricated support(s) 108, as compared to only using additional build material 112 to support the object 106. It may be advantageous to replace as much conventional support material as possible with the pre-fabricated supports in order to avoid waste of the build material. Where the computer determines the volume (if any) of the pre-fabricated support(s) may replace conventional support material (e.g., additional build material), the computer 102 may be configured to access the geometric parameters of the pre-fabricated supports 108 so as to determine the respective heights of the pre-fabricated supports based on the heights of regions in the computer geometric model, the heights of the regions and respective heights of the pre-fabricated supports being defined by a distance from a bottommost region of the computer geometric model in a direction of a z-axis. The computer may also be configured to determine a respective height of the additional build material, if any, to be deposited on or adjacent to the pre-fabricated supports or object.

Figure 2B:
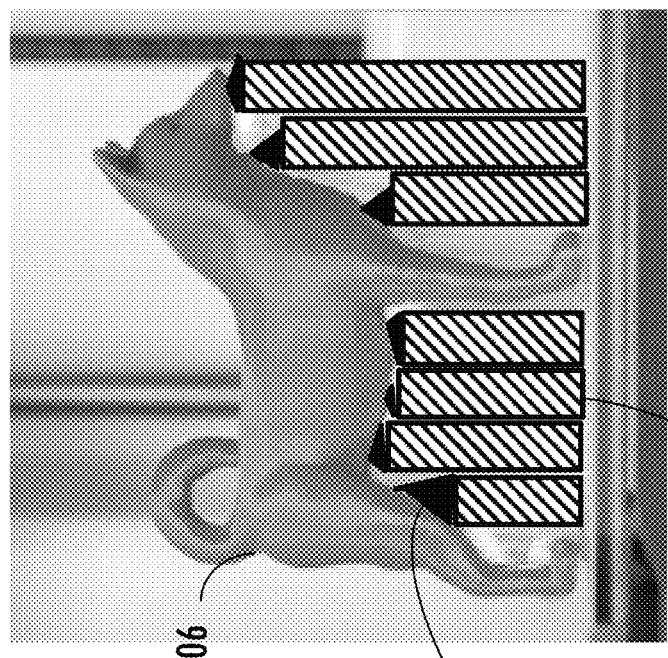
FIG. 2B illustrates an example three-dimensional object, pre-fabricated supports, and additional build material, in accordance with example implementations of the present disclosure.
Figure 2A:
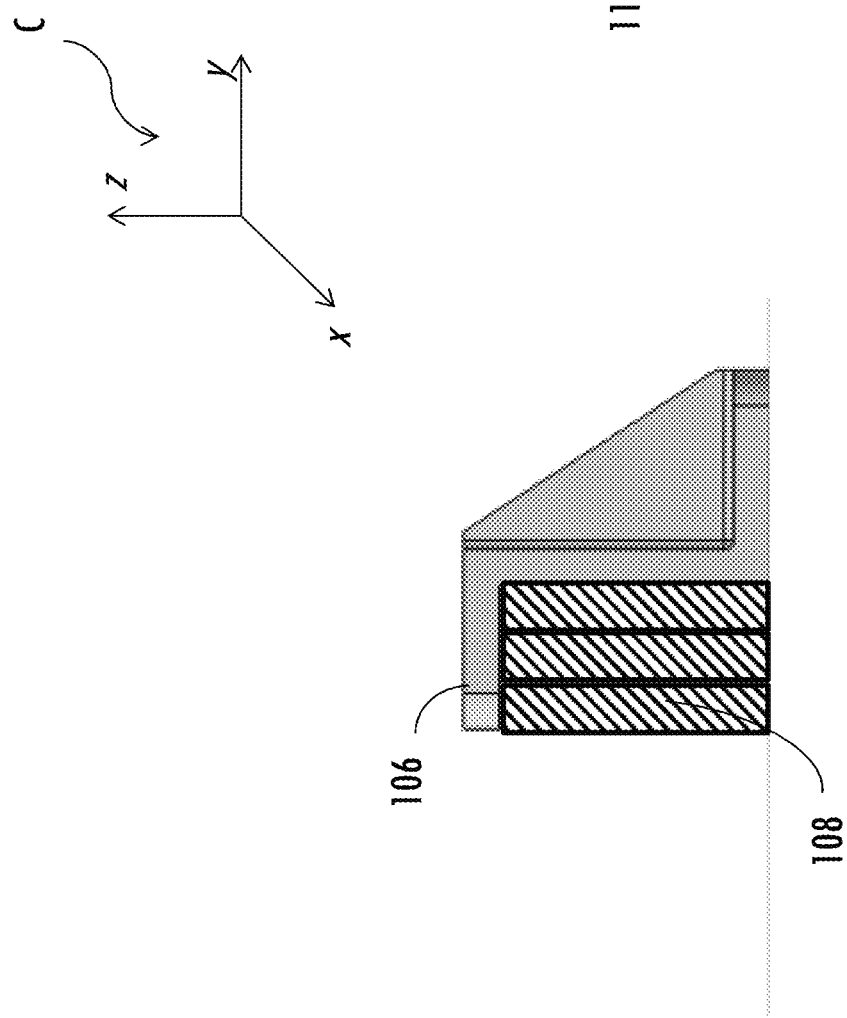
FIG. 2A illustrates an example three-dimensional object and pre-fabricated supports, in accordance with example implementations of the present disclosure.
Figure 8B:
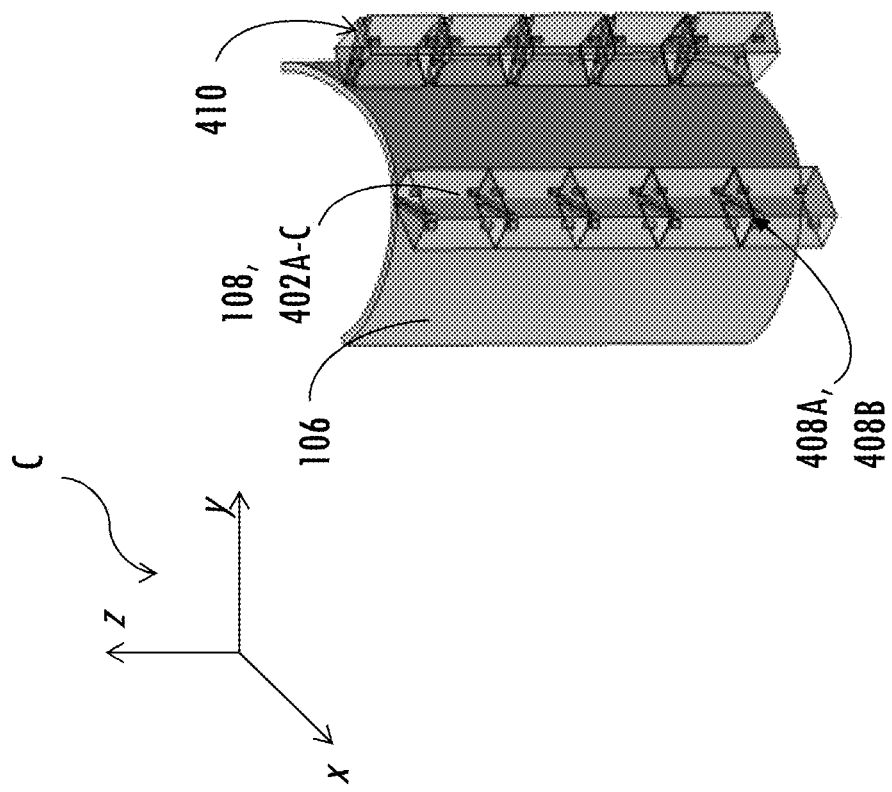
FIGS. 8A and 8B illustrate example arrangements of pre-fabricated supports comprising modular structures and supporting an object deposited by an additive manufacturing system, in accordance with other example implementations of the present disclosure.
Figure 8A:
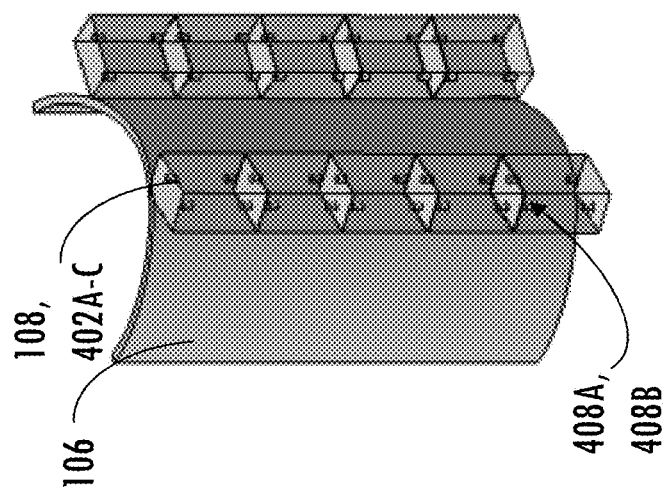

In some example implementations, the computer 102 is then configured to generate an arrangement of the pre-fabricated supports 108 with respective coordinates in the coordinate system C. The pre-fabricated supports may be arrangeable in the computer-generated arrangement with the respective coordinates in the coordinate system, to support the three-dimensional object 106 in the coordinate system during additive manufacturing. The computer is configured to generate the arrangement based on the computer geometric model analyzed as described above, for example, of the three-dimensional object and the geometric parameters, determined as described above, for example, of the pre-fabricated supports. The coordinate system may define orthogonal axes including x- and y-axes, and a z-axis. One example of an arrangement of pre-fabricated supports supporting an object deposited by an additive manufacturing system is illustrated in FIG. 2A, while another arrangement of pre-fabricated supports and additional build material supporting an object deposited by an additive manufacturing system is illustrated in FIG. 2B. Other examples of arrangements of pre-fabricated supports, with and without additional build material supporting the object, are illustrated in FIGS. 4, 8A, and 8B.

Accordingly, the arrangement generated by the computer 102 may comprise commands or instructions for arranging the pre-fabricated supports 108 in a manner that reduces stresses (e.g., residual stress) of the three-dimensional object 106 during the build process. For example, the arrangement may include at least respective heights of the pre-fabricated supports being defined by a distance from a bottommost region of the computer geometric model in the direction of the z-axis. In another example, the arrangement may include at least a location of the pre-fabricated supports at the respective heights to support the regions of the three-dimensional object identified as requiring support. Notably, the computer is configured to generate different arrangements of the pre-fabricated supports for different three-dimensional objects having different computer geometric models.

In this manner, the generated arrangement of the pre-fabricated supports 108 may be used to reduce the effects of stresses in the three-dimensional object 106. Stresses of the three-dimensional object during additive manufacturing may be a major reason for the build failures, geometrical distortions and cracks in the three-dimensional object. The arrangement of the pre-fabricated supports may be used to reduce these effects. A real physical simulation of the build process to determine where stresses may occur during the build process may be accomplished by techniques such as finite element analysis (FEA).

The computer 102 may be further configured to at least form layer data defining layers of the computer geometric model independent of the pre-fabricated supports 108. The layer data may comprise a plurality of layers of the computer geometric model. The computer may also be configured to format the layer data for the additive manufacturing system 104, which is configured to manipulate build material to form the three-dimensional object 106 on a layer-by-layer basis, with the pre-fabricated supports in the arrangement being configured to support the three-dimensional object as the three-dimensional object is formed. In particular, the computer may format the layer data by creating a tool path therefrom for receipt by the additive manufacturing system 104. The tool path will be a defined as a layer-by-layer path that the extruder 110 will follow in depositing each layer of the build material.

In some example implementations, the computer 102 is configured to format the layer data using a filter to section each layer of the tool path into an area grid defining a plurality of modules. For each layer of the tool path, the computer may determine modules of the area grid that only contain pre-fabricated supports 108 and those that contain only build material. The modules that contain only pre-fabricated supports will be deleted, while modules that contain only build material will not be deleted. Modules of the area grid containing neither build material nor pre-fabricated supports will be deleted from that layer of the tool path.

In some example implementations, the arrangement generated by the computer 102 may include commands or instructions for arranging the pre-fabricated supports 108 during the build process. For example, the computer may be configured to determine at an automatic or a manual method of arranging the pre-fabricated supports and/or what step during the build process to arrange the pre-fabricated supports, a method of arranging the pre-fabricated supports (e.g., are the supports inserted manually or automatically), and the like The computer may then also output the commands or instructions to the additive manufacturing system 104 to arrange the pre-fabricated supports 108, based on the arrangement, on a layer-by-layer basis up to respective heights so as to support the build material deposited for that layer. The arrangement of the pre-fabricated supports may be completed after the deposition of the build material for that layer. The additive manufacturing system 104 may be manual or automated with regard to arranging the pre-fabricated supports 108 up to the respective heights. Where the additive manufacturing system 104 is automated, the system may include an automatic actuator to raise the modules a single layer's height in the direction of the z-axis.

Figure 3A:
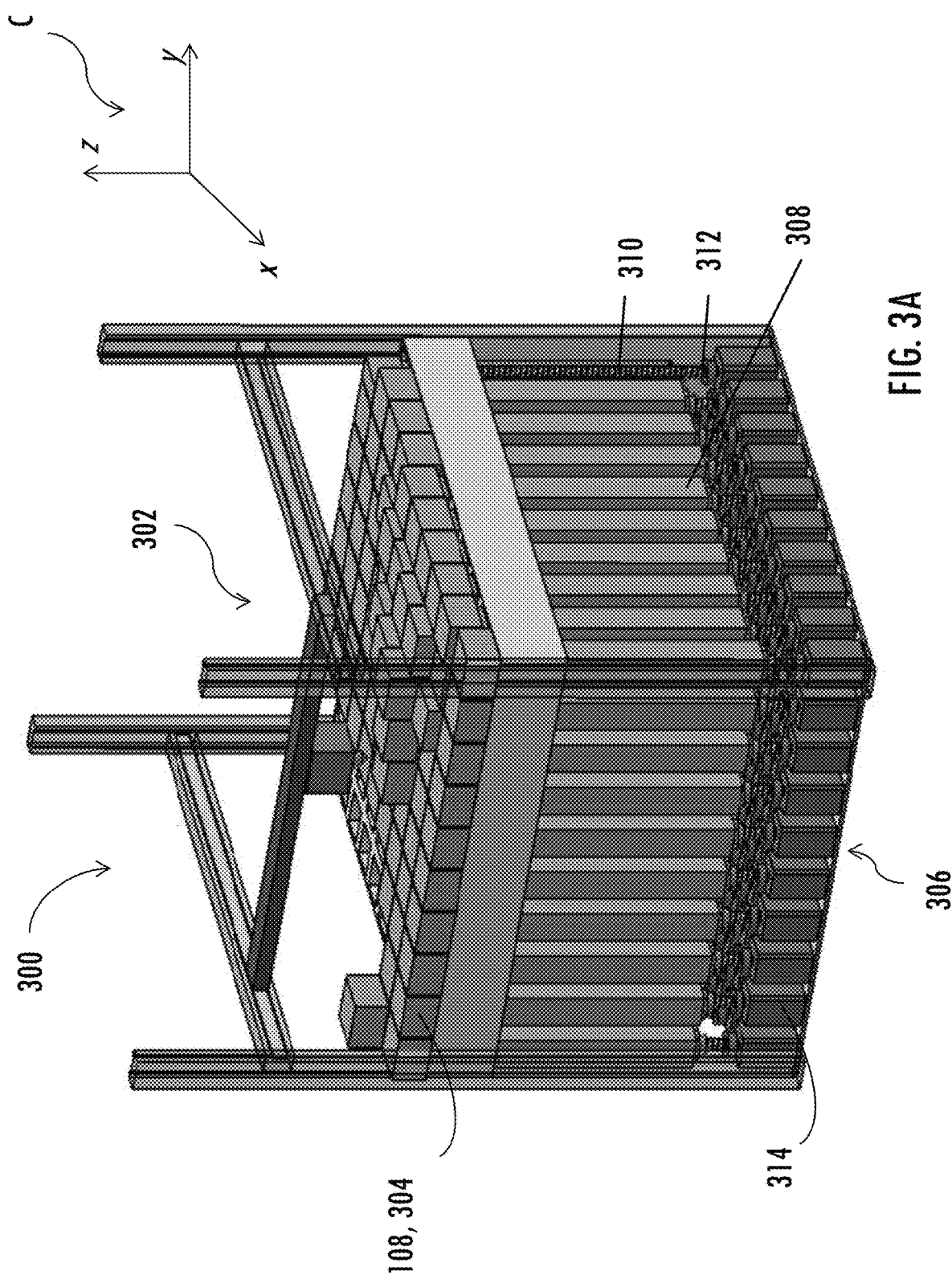

FIGS. 2A and 2B each illustrate arrangements of pre-fabricated supports 108 to support a three-dimensional object 106 formed by additive manufacturing, where the pre-fabricated supports and the three-dimensional object may be generally referred to using the same nomenclature as in FIG. 1. FIGS. 3A, 3B illustrate an example implementation of the pre-fabricated supports used to support, for example, one of the three-dimensional objects in one or both of FIGS. 2A and 2B.

In FIG. 2A, a three-dimensional object 106 is illustrated. As shown in FIG. 2A, the pre-fabricated supports 108 may be arranged to support the three-dimensional object in light of the arrangement generated by a computer, such as, for example, computer 102 in FIG. 1. The pre-fabricated supports in FIG. 2A are arranged in the z-axis to respective heights as defined by the arrangement so as to support a bottommost region of the three-dimensional object.

In FIG. 2B, a three-dimensional object 106 is illustrated. As shown in FIG. 2B, the three-dimensional object is complex and comprises multiple curved surfaces at different heights relative to a z-axis. The pre-fabricated supports 108 arranged to support the three-dimensional object are shown as arranged in light of the arrangement generated by a computer, such as, for example, computer 102 in FIG. 1. The pre-fabricated supports in FIG. 2B are arranged in the z-axis to respective heights as defined by the arrangement so as to support a bottommost region of the three-dimensional object.

However, as illustrated in FIG. 2B, additional build material 112 may be deposited on top of (or adjacent to) the pre-fabricated supports 108 in order to support the object 106. The additional build material may be utilized where the extruder 110 may interfere with the pre-fabricated supports. For example, and as illustrated in FIG. 2B, the pre-fabricated supports are not sized/shaped to adequately support the object in the direction of the z-axis (e.g., the pre-fabricated supports are not tapered to contour to the shape of the object). As such, the additional build material is deposited between a bottommost surface of the object and an uppermost surface of the pre-fabricated support so that the additional build material tapers in the direction of the z-axis to support the contours of the bottommost surface of the object.

FIGS. 3A, 3B illustrate a system for additive manufacturing a three-dimensional object, generally referred to as 300. The system may be configured with the pre-fabricated supports 108, which may be pre-arranged in the directions of the x- and y-axes and adjustable in the direction of the z-axis to respective heights as defined by the arrangement to support an object, such as object 106 (FIGS. 2A and 2B).

In some example implementations, and as illustrated in particular in FIG. 3A, the pre-fabricated supports 108 may be pre-arranged in a patterned grid 302 in the directions of the x- and y-axes. The patterned grid may repeat across the x- and y-axes. The pre-fabricated supports may define modules 304 in the patterned grid, such that each pre-fabricated support defines a single module. The modules may be independently height adjustable in the direction of the z-axis to respective heights as defined by the arrangement.

The system 300 may further comprise actuators 306 coupled to and configured to move respective ones of the modules 304 in the direction of the z-axis such that the modules are independently height adjustable in the direction of the z-axis. In some example implementations, as illustrated in FIGS. 3A and 3B, the actuator may comprise a plurality of linear shafts 308, each linear shaft being coupled to a bottommost surface of the modules in a direction of the z-axis. Each of linear shafts may be independently height adjustable in a direction of the z-axis to variably adjust each of corresponding modules up to the respective height as defined by the arrangement.

In some examples, each linear shaft 308 is independently height adjustable via a lead screw 310 that may extend longitudinally at least partially through the linear shaft in a direction of the z-axis. The linear shaft may thus define a hollow interior along a direction of the z-axis to receive the lead screw at least partially therethrough. The lead screw may be threaded in some examples in order to receive a threaded screw nut 312 thereabout. In some examples, rotation of the screw nut in the clockwise direction about the z-axis may act to urge the linear shaft and thereby the corresponding module up in the direction of the z-axis. Conversely, rotation of the screw nut in the counter-clockwise direction about the direction of the z-axis may bring the linear shaft and thereby the corresponding module down in the direction of the z-axis.

The adjustment of each of the modules 304 of the system 300 may be accomplished manually or automatically. For example, the screw nuts 312 may be rotated by a user until the corresponding module is at the respective height as defined by the arrangement. Otherwise, the screw nut may be automatically adjusted using, for example, a motor 314. For example, the motor may be coupled to or otherwise attached to the lead screw 308 at a bottommost portion thereof. The motors may be actuated by a peripheral system, such as a computer 102, to rotate the lead screws about the z-axis. Other methods for adjusting each of the modules of the system may comprise a ratcheting mechanism using a push rod (not shown) to independently height adjust each of the modules in the direction of the z-axis.

The system 300 may further comprise a computer, such as a computer 102 in FIG. 1, that may be used to generate the arrangement. The computer may be configured to at least form layer data defining layers of the computer geometric model independent of the modules 304, and format the layer data for an additive manufacturing system, such as an additive manufacturing system 104 as illustrated in FIG. 1, configured to manipulate build material to form the three-dimensional object 106 on a layer-by-layer basis, with the modules 304 in the arrangement being configured to support the three-dimensional object as the three-dimensional object is formed.

In addition, the computer 102 of the system 300 may also be configured to operate the additive manufacturing system.

In some example implementations, the additive manufacturing of the system may include an extruder such as the extruder 110. The extruder of the system may receive the formatted layer data in the form of a tool path to deposit or dispense build material in a layer-by-layer basis onto respective modules 304 as defined by the arrangement. The format of the tool path may result in a command or instructions to arrange modules identified as comprising only the pre-fabricated supports 108 in the direction of the z-axis, e.g., up to the respective height.

FIGS. 4, 5, 6, 7, 8A and 8B illustrate another system for additive manufacturing a three-dimensional object, the system generally being referred to as 400. The system may be configured with pre-fabricated supports 108, which may be pre-arranged in the directions of the x- and y-axes and adjustable in the direction of the z-axis to respective heights as defined by the arrangement to support an object, such as object 106, the pre-fabricated supports and the three-dimensional object may be generally referred to using the same nomenclature as in FIG. 1.

In some example implementations, and as illustrated in particular in FIG. 4, the pre-fabricated supports 108 may comprise modular structures (one first type of modular structure 402A being shown) arrangeable on modules 404 of a patterned grid 406 repeating in the directions of the x- and y-axes, and independently stackable in the direction of the z-axis to the respective heights, as defined by the arrangement.

The modules 404 of the patterned grid 406 may be magnetic modules, such that the module itself is magnetic or has a magnetic coating applied thereto. Otherwise, the modules may comprise an alignment element that enables the modular structures 402 to be arranged and aligned thereon. For example, the alignment element may comprise a protrusion or orifice that may be aligned with the opposite on a bottom surface of the modular structure.

In FIG. 4, the modular structure is a first type modular structure 402A, although other type modular structures may also be used to support the three-dimensional object. In some example implementations, the system 400 may comprise a plurality of types of modular structures. In general, different types of modular structures may be used for different purposes. Cone or solid-wall modular structures, for example, may be used for anchoring, to prevent distortion or warping of the three-dimensional object 106 at specific points. A solid or similar modular structure may be used to extend the geometry of the three-dimensional object down and thereby address total stress—to make sure the accumulated stress of the three-dimensional object does not create distortions. In other examples, wall modular structures may be used for heat removal in areas that accumulate heat, which may be the consequence of thin geometry in specific layers, or of massive sintering in the same area between multiple layers.

Accordingly, for example, FIG. 5 illustrates three types of modular structures 402A, 402B and 402C that may be used in the system 400. In this example, the modular structures include a first type modular structure 402A with a bottom surface that is alignable with a selected one of the modular structures 404 as defined by the arrangement. In some example implementations, the modular structures may be magnetic modules, so that the first type modular structure has a magnetic bottom surface that is alignable with a selected one of the magnetic modules as defined by the arrangement. The first type modular structure may have a top surface with first alignment elements 408A opposing the bottom surface of the first type modular structure. The first type of alignment elements may include a magnet, a protrusion, an orifice, a screw, an adhesive, and the like. The top surface of the first type modular structure may also be configured to support the three-dimensional object 106 during additive manufacturing, as in, for example, FIG. 4.

The modular structures may further include a second type modular structure 402B with a bottom surface having second alignment elements 408B alignable with the first alignment elements 408A on the top surface of the first type modular structure 402A. The second alignment elements may be alignment elements that correspond to (i.e., align with) the first alignment elements. For example, the first alignment elements may comprise a protrusion, while the second alignment elements may comprise an orifice alignable with the protrusions. The second type modular structure may also have a top surface with the first alignment elements, the top surface opposing the bottom surface with the second alignment elements. The first and second alignment elements on the second type modular structure may be the same alignment elements or may be different alignments.

The modular structures may further include a third type modular structure 402C with a bottom surface having the second alignment elements 408B alignable with the first alignment elements 408A of the top surface of the second type modular structure 402B, or alignable with the top surface of the first type modular structure 402A. The third type modular structure may also be configured with a bottom surface in addition to the second alignment elements so as to align with a selected one of the modular structures as defined by the arrangement, where only the third type modular structure is defined in the arrangement. The third type modular structure may also comprise an opposing top surface to support the three-dimensional object 106 during additive manufacturing.

Accordingly, each type of modular structure 402A-402C may comprise a different shape and/or size, or may otherwise be a same shape and/or size. A computer associated with the system 400, such as computer 102 in FIG. 1, may access geometric parameters of the modular structures, including a size and/or shape of the types of modular structures available, and generate the arrangement based on at least the size and/or shape of the types of modular structures available as well as the computer geometric module.

The computer 102 may thus be configured to access the geometric parameters and determine which of the modular structures including the first type modular structure, the second type modular structure, and the third type modular structure to arrange on the patterned grid in the directions of the x- and y-axes, and stack in the direction of the z-axis to the respective heights as defined by the arrangement.

Further, for example, the computer 102 of the system 400 may be configured to at least form layer data defining layers of the computer geometric model independent of the modular structures 402A-C, and format the layer data for an additive manufacturing system, such as an additive manufacturing system 104 as illustrated in FIG. 1, configured to manipulate build material to form the three-dimensional object 106 on a layer-by-layer basis, with the determined modular structures in the arrangement being configured to support the three-dimensional object as the three-dimensional object is formed.

In addition, the computer 102 of the system 400 may be configured to operate the additive manufacturing system. In some example implementations, the additive manufacturing of the system may include an extruder such as the extruder 110. The extruder of the system may receive the formatted layer data in the form of a tool path to deposit or dispense build material in a layer-by-layer basis onto respective modular structures 402A-C as defined by the arrangement. The format of the tool path may result in a command or instructions to arrange the modular structures identified as comprising only the pre-fabricated supports 108 in the direction of the z-axis, e.g., up to the respective height.

The computer 102 of the system 400 may further be configured to generate an arrangement that avoids interference of the extruder 110 with the modular structures. Where the modular structures are arranged prior to deposition of the build material, the arrangement may include utilization of a differently shaped extruder. Otherwise, and as illustrated in FIG. 6, the arrangement may include modular structures 402A-C that do not interfere with the extruder. For example, a modular structure 402A having a tapered edge in the direction of the z-axis may be utilized so as to allow for clearance of the extruder. In such an example, additional build material 112 may be deposited on the modular structure having a tapered edge in order to support the object 106. While this additional build material may require removal from the object after the additive manufacturing session is complete, the additional build material will be necessarily less than if build material was used to form an entire support structure.

In another example, the arrangement may include modular structures 402A-C that are arranged after at least one layer of the build material is deposited. FIG. 7 illustrates such a scenario, where the extruder 110 has deposited or dispensed one or more layers of the build material, at which point the identified modular structure 402A is arranged on the patterned grid 406. In this instance, after the extruder has deposited or dispensed a certain number of layers as determined by the arrangement, a command may be output from the computer 102 to the additive manufacturing system 104 to arrange the modular structure according to the arrangement.

In some example implementations, an object 106 may comprise a contour such that the modular structures 402A-C may be arranged adjacent to the module 404 of the patterned grid 406 receiving the build material. For example, and as illustrated in FIGS. 8A and 8B, the modular structures may be stacked on top of one another up to the respective height in a module adjacent to object. FIG. 8A illustrates the modular structures stacked on top of one another using first and second alignment elements 408A, 408B, where only a small portion (e.g., an edge) of each of the modular structure supports the object. By comparison, FIG. 8B illustrates the modular structures stacked on top of one another using first and second alignment elements, with a top surface of each modular structure defining a slot 410 extending along the x- and y-axes. The extruder may be configured to deposit a small bead of build material along the slot so that there is additional support of the object.

Figure 9:
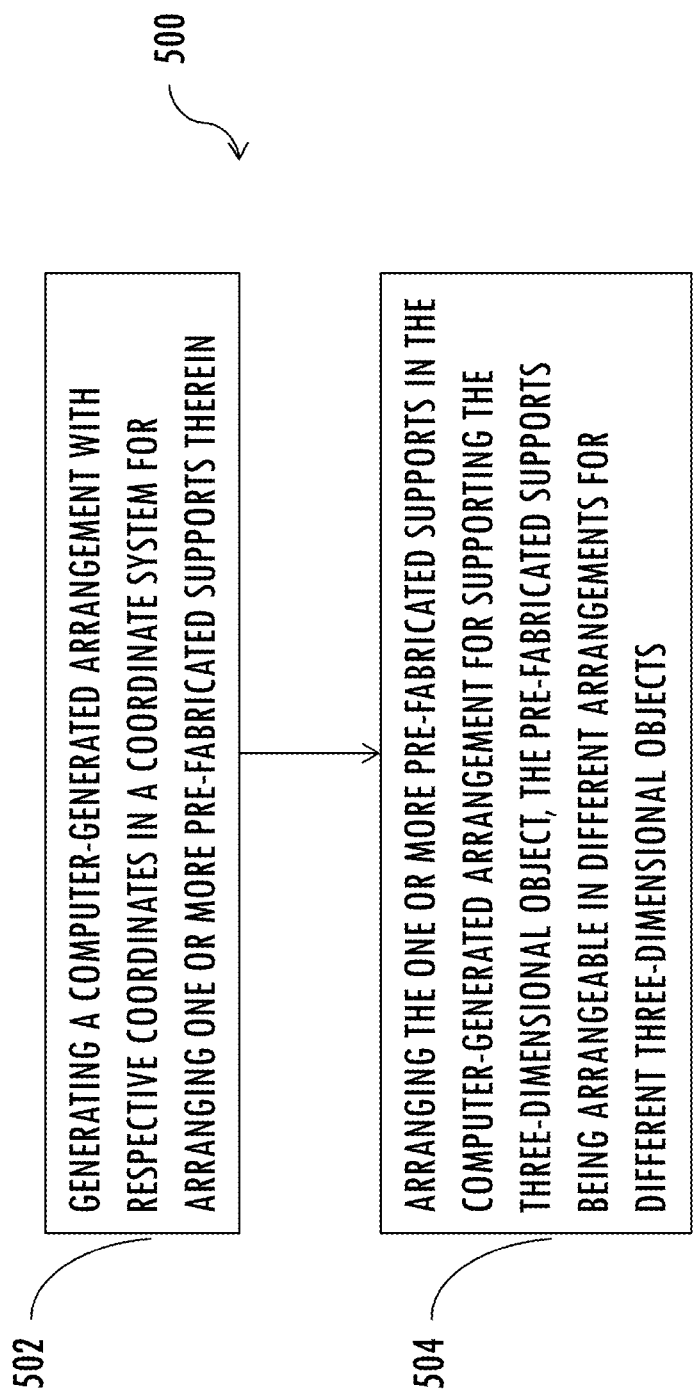
FIG. 9 illustrates a method for supporting a three-dimensional object during additive manufacturing, in accordance with other example implementations of the present disclosure.

FIG. 9 illustrates a method 500 for supporting a three-dimensional object during additive manufacturing. In some examples, the method may be provided to utilize the pre-fabricated supports 108 for supporting a three-dimensional object 106 as illustrated in FIG. 1.

In the method 500, a computer-generated arrangement with respective coordinates in a coordinate system for arranging one or more pre-fabricated supports therein may be generated, block 502.

In the method 500, the one or more pre-fabricated supports may be arranged in the computer-generated arrangement for supporting the three-dimensional object, the pre-fabricated supports being arrangeable in different arrangements for different three-dimensional objects, block 504.

Figure 10:
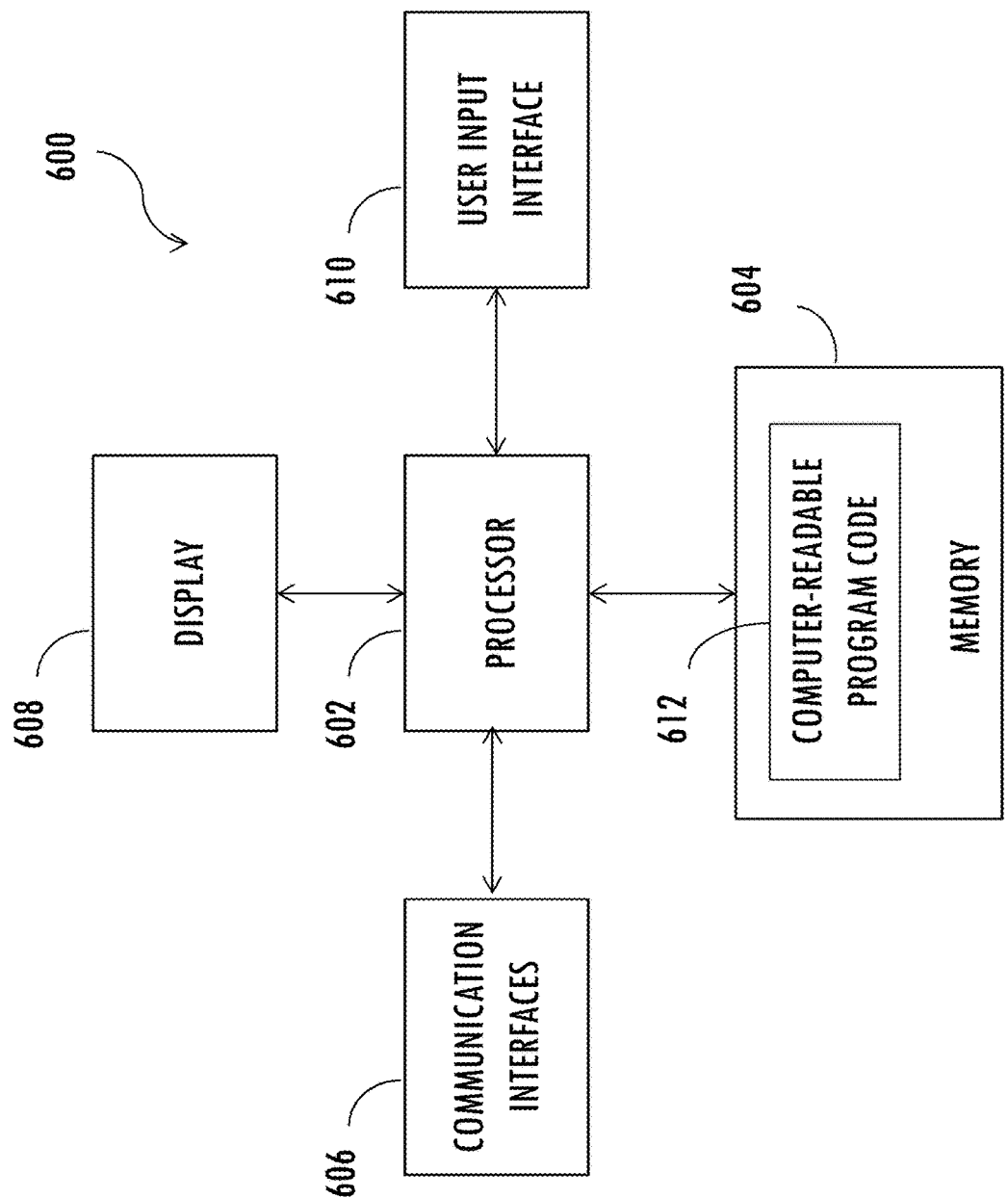
FIG. 10 illustrates an apparatus that in some examples may correspond to the computer of the system illustrated in FIG. 1.

FIG. 10 illustrates an apparatus 600 that in some examples may correspond to the computer 102 of FIG. 1. In some examples, the apparatus may be provided by more than one apparatus connected to or otherwise in communication with one another in a number of different manners, such as directly or indirectly by wire or via a wired or wireless network or the like.

Generally, the apparatus 600 may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor 602 connected to a memory 604. In this regard, the apparatus may include hardware configured to function as or otherwise implement operations according to example implementations, alone or under direction of one or more computer program code instructions, program instructions or executable computer-readable program code instructions (at times generally referred to as "computer programs," e.g., software, firmware, etc.) from a computer-readable storage medium.

The processor 602 is generally any piece of computer hardware capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory (of the same or another apparatus).

The memory 604 is generally any piece of computer hardware capable of storing information such as, for example, data, computer programs and/or other suitable information either on a temporary basis and/or a permanent basis. The memory may include volatile and/or non-volatile memory, and may be fixed or removable. In various instances, the memory may be referred to as a computer-readable storage medium that is non-transitory and capable of storing information, and distinguishable from computer-readable transmission media such as electronic transitory signals capable of carrying information from one location to another. Computer-readable medium as described herein generally refers to a computer-readable storage medium or computer-readable transmission medium.

In addition to the memory 604, the processor 602 may also be connected to one or more interfaces fir displaying, transmitting and/or receiving information. The interfaces may include a communications interface 606 and/or one or more user interfaces. The communications interface may be configured to transmit and/or receive information, such as to and/or from the apparatus 600 and other apparatus(es), network(s) or the like. The communications interface may be configured to transmit and/or receive information by physical (wired) and/or wireless communications links.

The user interfaces may include a display 608 and/or one or more user input interfaces 610. The display may be configured to present or otherwise display information to a user. The user input interface may be configured to receive information from a user into the apparatus 600, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners, additive manufacturing systems or the like.

As indicated above, program code instructions 612 may be stored in memory (e.g., memory 604), and executed by a processor (e.g., processor 602), to implement functions of the computer 102 described herein. As will be appreciated, any suitable program code, instructions may be loaded onto a programmable apparatus (e.g., apparatus 600) from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions 612 may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions 612 by a processor, or storage of instructions in a computer-readable storage medium 604, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for additive manufacturing a three-dimensional object, the system comprising:
pre-fabricated supports arrangeable to support the three-dimensional object during additive manufacturing; and
a computer configured to at least:
access a computer geometric model of the three-dimensional object, and geometric parameters of the pre-fabricated supports; and
generate an arrangement of the pre-fabricated supports with respective coordinates in a coordinate system, to support the three-dimensional object in the coordinate system during additive manufacturing, the computer being configured to generate the arrangement based on the computer geometric model of the three-dimensional object and the geometric parameters of the pre-fabricated supports, the computer being configured to generate different arrangements of the pre-fabricated supports for different three-dimensional objects having different computer geometric models,
wherein the coordinate system defines orthogonal axes including x- and y-axes, and a z-axis, and the pre-fabricated supports are independently height adjustable in the direction of the z-axis to respective heights as defined by the arrangement,
wherein the pre-fabricated supports comprise modular structures arrangeable on modules of a patterned grid in the directions of the x- and y-axes, and independently stackable in the direction of the z-axis to the respective heights, as defined by the arrangement; and
wherein the modules are magnetic modules, and a bottom surface of at least one of the modular structures is a magnetic bottom surface that is alignable with the selected one of the magnetic modules as defined by the arrangement.

2. The system of claim 1, wherein the computer is further configured to at least:
form layer data defining layers of the computer geometric model independent of the pre-fabricated supports; and
format the layer data for an additive manufacturing system configured to manipulate build material to form the three-dimensional object on a layer-by-layer basis, with the pre-fabricated supports in the arrangement being configured to support the three-dimensional object as the three-dimensional object is formed.

3. The system of claim 1, wherein the computer being configured to generate the arrangement includes being configured to:
analyze the computer geometric model to identify regions of the three-dimensional object requiring support;
determine heights of the regions in the computer geometric model of the three-dimensional object; and
determine the respective heights of the pre-fabricated supports based on the heights of regions in the computer geometric model, the heights of the regions and the respective heights of the pre-fabricated supports being defined by a distance from a bottommost region of the computer geometric model in the direction of the z-axis.

4. The system of claim 3, wherein the computer configured to generate the arrangement includes being configured to determine an automatic or a manual method of arranging the pre-fabricated supports.

5. The system of claim 1, wherein the geometric parameters of the pre-fabricated supports comprise at least one of a surface area of an uppermost region of each of the pre-fabricated supports, a height of each of the pre-fabricated supports defined by a distance from a bottommost region to the uppermost region of each of the pre-fabricated supports in the direction of the z-axis, or a shape of each of the pre-fabricated supports.

6. The system of claim 1, further comprising the additive manufacturing system including an extruder configured to dispense build material on the pre-fabricated supports to form the three-dimensional object based on the computer geometric model of the three-dimensional object.

7. A system for additive manufacturing a three-dimensional object, the system comprising:
pre-fabricated supports arrangeable to support the three-dimensional object during additive manufacturing; and
a computer configured to at least:
access a computer geometric model of the three-dimensional object, and geometric parameters of the pre-fabricated supports; and
generate an arrangement of the pre-fabricated supports with respective coordinates in a coordinate system, to support the three-dimensional object in the coordinate system during additive manufacturing, the computer being configured to generate the arrangement based on the computer geometric model of the three-dimensional object and the geometric parameters of the pre-fabricated supports, the computer being configured to generate different arrangements of the pre-fabricated supports for different three-dimensional objects having different computer geometric models,
wherein the pre-fabricated supports comprise modular structures that are pre-arranged on modules of a patterned grid in the directions of the x- and y-axes, and the modules are independently height adjustable in the direction of the z-axis to the respective heights as defined by the arrangement,
wherein the computer is configured to output layer data to an additive manufacturing system configured to manipulate build material to form the three-dimensional object on a layer-by-layer basis, and output commands or instructions to the additive manufacturing system further configured to arrange the pre-fabricated supports, based on the arrangement, on a layer-by-layer basis up to respective heights so as to support the build material for that layer; and
wherein the modules are magnetic modules, and a bottom surface of at least one of the modular structures is a magnetic bottom surface that is alignable with the selected one of the magnetic modules as defined by the arrangement.

8. The system of claim 7, further comprising actuators coupled to and configured to move respective ones of the modules in the direction of the z-axis such that the modules are independently height adjustable in the direction of the z-axis.

9. The system of claim 1, wherein the modular structures include a first type modular structure with a magnetic bottom surface that is alignable with a selected one of the magnetic modules as defined by the arrangement.

10. The system of claim 9, wherein the first type modular structure has a top surface with first alignment elements opposing the bottom surface, and the modular structures further include a second type modular structure with a bottom surface having second alignment elements alignable with the first alignment elements on the top surface of the first type modular structure, and wherein the second type modular structure has a top surface with the first alignment elements opposing the bottom surface with the second alignment elements, and the modular structures further include a third type modular structure with a bottom surface having the second alignment elements alignable with the first alignment elements of the top surface of the second type modular structure, or the top surface of the first type modular structure, the third type modular structure also with an opposing top surface to support the three-dimensional object during additive manufacturing.

11. The system of claim 9, wherein the computer configured to generate the arrangement is further configured to generate the arrangement of the modular structures on the individual modules of the patterned grid, and which of the modular structures including the first type modular structure, the second type modular structure, and the third type modular structure to arrange on the patterned grid in the directions of the x- and y-axes, and stack in the direction of the z-axis to the respective heights as defined by the arrangement.

12. Pre-fabricated supports arrangeable to support a three-dimensional object during additive manufacturing,
wherein the pre-fabricated supports are arrangeable in a computer-generated arrangement with respective coordinates in a coordinate system, to support the three-dimensional object in the coordinate system during additive manufacturing, the pre-fabricated supports being arrangeable in different arrangements for different three-dimensional objects,
wherein the coordinate system defines orthogonal axes including x- and y-axes, and a z-axis, and the pre-fabricated supports are independently height adjustable in the direction of the z-axis to respective heights,
wherein the pre-fabricated supports comprise modular structures arrangeable on modules of a patterned grid in the directions of the x- and y-axes, and independently stackable in the direction of the z-axis to the respective heights; and
wherein the modules are magnetic modules, and a bottom surface of at least one of the modular structures is a magnetic bottom surface that is alignable with the selected one of the magnetic modules as defined by the arrangement.

13. The pre-fabricated supports of claim 12, wherein the modular structures include a first type modular structure with a magnetic bottom surface that is alignable with a selected one of the magnetic modules.

14. The pre-fabricated supports of claim 13, wherein the first type modular structure has a top surface with first alignment elements opposing the bottom surface, and the modular structures further include a second type modular structure with a bottom surface having second alignment elements alignable with the first alignment elements on the top surface of the first type modular structure, and wherein the second type modular structure has a top surface with the first alignment elements opposing the bottom surface with the second alignment elements, and the modular structures further include a third type modular structure with a bottom surface having the second alignment elements alignable with the first alignment elements of the top surface of the second type modular structure, or the top surface of the first type modular structure, the third type modular structure also with an opposing top surface to support the three-dimensional object during additive manufacturing.

15. The pre-fabricated supports of claim 12, wherein the generated arrangement includes a determination of an automatic or a manual method of arranging the pre-fabricated supports.

16. A method for supporting a three-dimensional object during additive manufacturing, the method comprising:
generating a computer-generated arrangement of pre-fabricated supports, including the computer generating the arrangement with respective coordinates in a coordinate system, to support the three-dimensional object in the coordinate system during additive manufacturing, the pre-fabricated supports comprise modular structures that are pre-arranged on modules of a patterned grid in the directions of the x- and y-axes, and the modules are independently height adjustable in the direction of the z-axis to the respective heights as defined by the computer-generated arrangement;
outputting layer data to an additive manufacturing system to cause the additive manufacturing system to manipulate build material to form the three-dimensional object on a layer-by-layer basis; and
outputting commands or instructions to the additive manufacturing system to cause the additive manufacturing system to arrange the pre-fabricated supports, based on the computer-generated arrangement, on a layer-by-layer basis up to respective heights for each layer so as to support the build material for that layer;
wherein the modules are magnetic modules, and a bottom surface of at least one of the modular structures is a magnetic bottom surface that is alignable with the selected one of the magnetic modules as defined by the arrangement.

17. The method of claim 16, wherein the coordinate system defines orthogonal axes including x- and y-axes, and a z-axis, and the commands or instructions are output to cause the additive manufacturing system to independently adjust a height of one or more pre-fabricated supports in the direction of the z-axis to respective heights.

18. The method of claim 16, wherein generating the computer-generated arrangement comprises determining an automatic or a manual method of arranging the one or more pre-fabricated supports in the computer-generated arrangement.

19. The system of claim 7, wherein the computer is configured to output the commands or instructions to cause the additive manufacturing system to complete the arrangement of the pre-fabricated supports for a layer of the three-dimensional object after that layer is formed.

20. The system of claim 7, wherein the modular structures include a first type modular structure with a magnetic bottom surface that is alignable with the selected one of the magnetic modules as defined by the arrangement.

21. The pre-fabricated supports of claim 16, wherein the modular structures include a first type modular structure with a magnetic bottom surface that is alignable with the selected one of the magnetic modules as defined by the arrangement.

22. The method of claim 16, wherein the commands or instructions are output to cause the additive manufacturing system to complete the arrangement of the pre-fabricated supports for a layer of the three-dimensional object after that layer is formed.

* * * * *